(12) United States Patent
Chang (10) Patent No.: US 8,547,056 B2
(45) Date of Patent: Oct. 1, 2013

(54) ONE-PIECE CAR CHARGER

(76) Inventor: Ching-Chih Chang, New Taipei (TW)

(*) Notice: Subject to any disclaimer, the term of this patent is extended or adjusted under 35 U.S.C. 154(b) by 343 days.

(21) Appl. No.: 12/986,134

(22) Filed: Jan. 6, 2011

(65) Prior Publication Data

US 2012/0176083 A1    Jul. 12, 2012

(51) Int. Cl.
*H02J 7/00*     (2006.01)
*H01R 25/00*    (2006.01)

(52) U.S. Cl.
USPC .......................................... 320/107; 439/638

(58) Field of Classification Search
USPC ........ 320/107; 439/629–632, 638; D13/107, D13/110
See application file for complete search history.

(56) References Cited

U.S. PATENT DOCUMENTS

| | | | | |
|---|---|---|---|---|
| 5,569,053 A * | 10/1996 | Nelson et al. | ................. | 439/668 |
| 5,964,623 A * | 10/1999 | Maher et al. | ................... | 439/668 |
| 6,135,798 A * | 10/2000 | Saruta et al. | ................... | 439/259 |
| 6,705,901 B1 * | 3/2004 | Lin | ............................... | 439/668 |
| 7,427,216 B1 * | 9/2008 | Wu et al. | ....................... | 439/638 |
| D654,027 S * | 2/2012 | Huang | ......................... | D13/144 |
| D667,377 S * | 9/2012 | Chan | .......................... | D13/144 |

\* cited by examiner

*Primary Examiner* — Richard V Muralidar (57) ABSTRACT

A one-piece car charger includes an enclosure and a circuit board. The circuit board is received in the enclosure and is electrically connected to a power output port. The enclosure is integrally formed as a one-piece configuration. The one-piece enclosure helps reducing manufacturing time (and is applicable to automatized manufacturing process). There is no need for operators to manually assemble the enclosures one by one so that the assembling time is shortened and mistakenly assembling incorrect parts is eliminated.

6 Claims, 9 Drawing Sheets

ONE-PIECE CAR CHARGER

(a) TECHNICAL FIELD OF THE INVENTION

The present invention generally relates to a car charger, and more particularly to a car charger that comprises an integrally-formed one-piece enclosure for shortening the manufacturing time thereof.

(b) DESCRIPTION OF THE PRIOR ART

Figure 1:
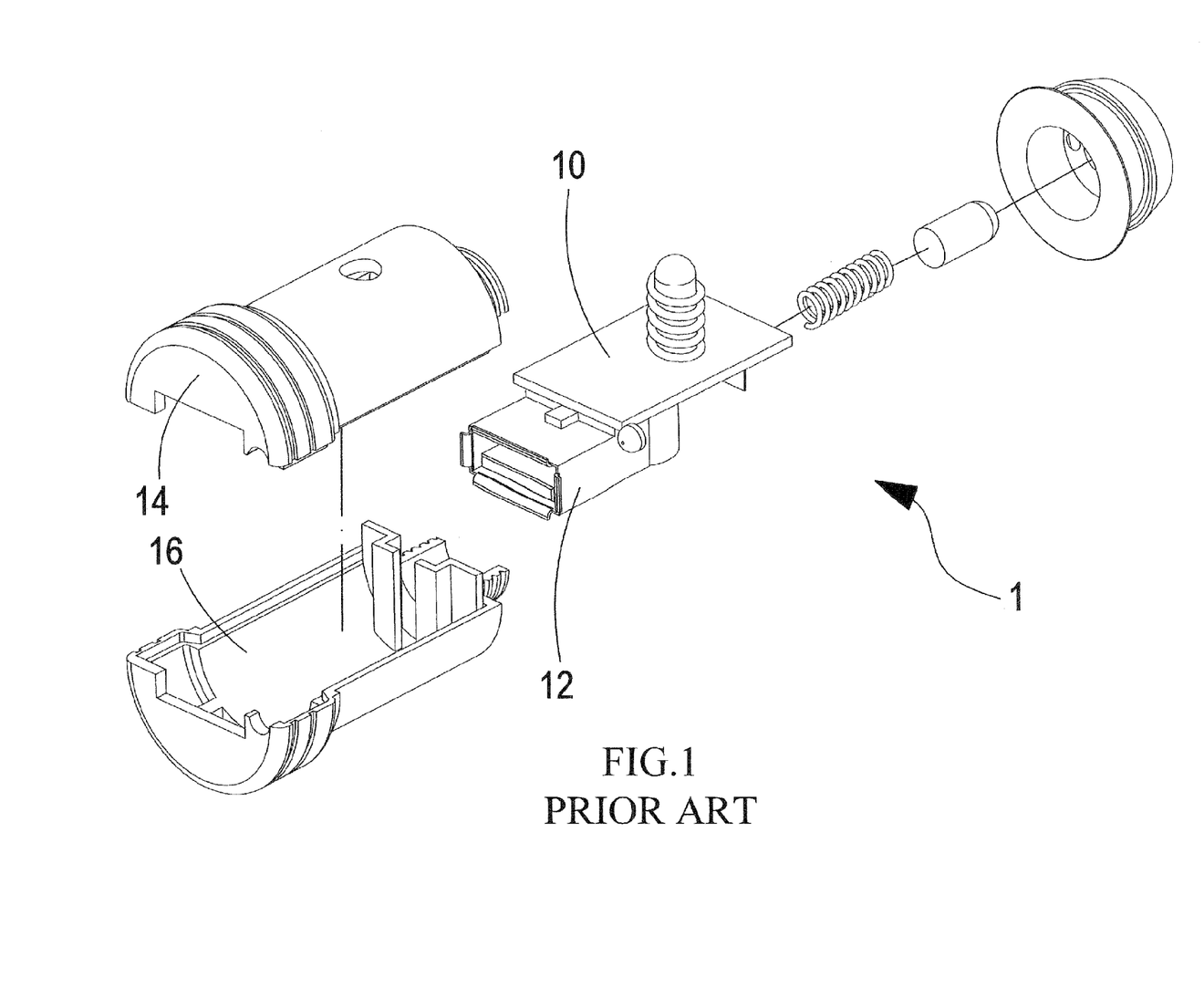
FIG. 1 shows a structure of conventional car charger.

A conventional car cigarette lighter socket based charging device (see FIG. 1) comprises a cigarette lighter plug 1, a power PCB module 10 received in the cigarette lighter plug 1, and a connector 12 in connection with the power PCB module 10. The cigarette lighter plug 1 is composed of two enclosure members 14, 16, which mate each other in upper and lower sides. Such a conventional cigarette lighter plug 1 can only be assembled in a manual or semi-automatic fashion. An operator must manually position the power PCB module 10 and the connector 12 into one enclosure member 14, and then mates the other enclosure member 16 to the enclosure member 14 for covering the internal parts. This way of manufacturing requires a long manufacturing time (for the operation cannot be fully automatized). Besides the long manufacturing time, the manual operation may easily lead to undesired damage of the parts and thus lower the passing rate of final product.

It is thus a challenge of the industry to overcome such a problem.

SUMMARY OF THE INVENTION

The present invention aims to overcome such a problem by providing an integrally-formed one-piece enclosure to serve as a casing of the car charger so as to shorten the manufacturing time of car chargers.

An objective of the present invention is to significantly shorten the manufacturing time (and being applicable to automatic manufacturing process), and there is no need for operators to assemble enclosures one by one, whereby the manufacturing time is reduced and mistakenly assembling incorrect parts can be eliminated.

To achieve the above objective, the present invention provides a one-piece car charger, which comprises an enclosure and a circuit board. The circuit board is received in the enclosure and is electrically connected to a power output port (a serial (USB) socket or a charging cable and socket for charging a regular electrical appliance). The enclosure is of an integrally-formed one-piece configuration. The enclosure forms an accommodation chamber that receives the circuit board to insert therein. The circuit board comprises a set of negative-electrode conductive spring plates, whereby in assembling the circuit board, the negative-electrode conductive spring plates are guided by and inserted into the accommodation chamber to be received in and engage through holes formed in the enclosure. The enclosure has a front end forming a conic cap that helps the insertion of a positive-electrode conductive contact.

Another objective of the present invention is to improve passing rate of assembled products.

A further objective of the present invention is to reduce the overall manufacturing costs.

A further objective of the present invention is to improve overall manufacturing efficiency and increase throughput.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 2:
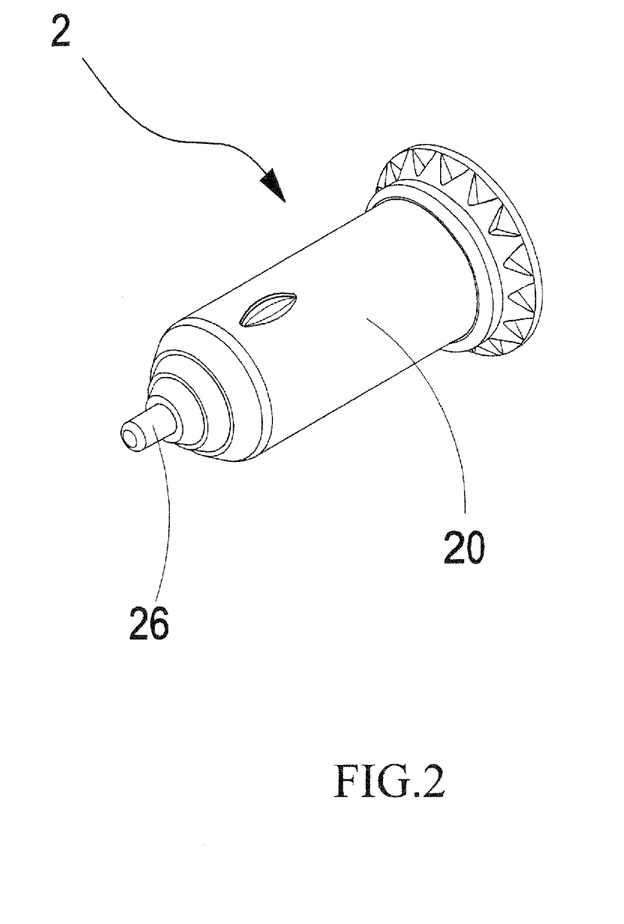
FIG. 2 is a perspective view showing a one-piece car charger constructed in accordance with a preferred embodiment of the present invention.
Figure 3:
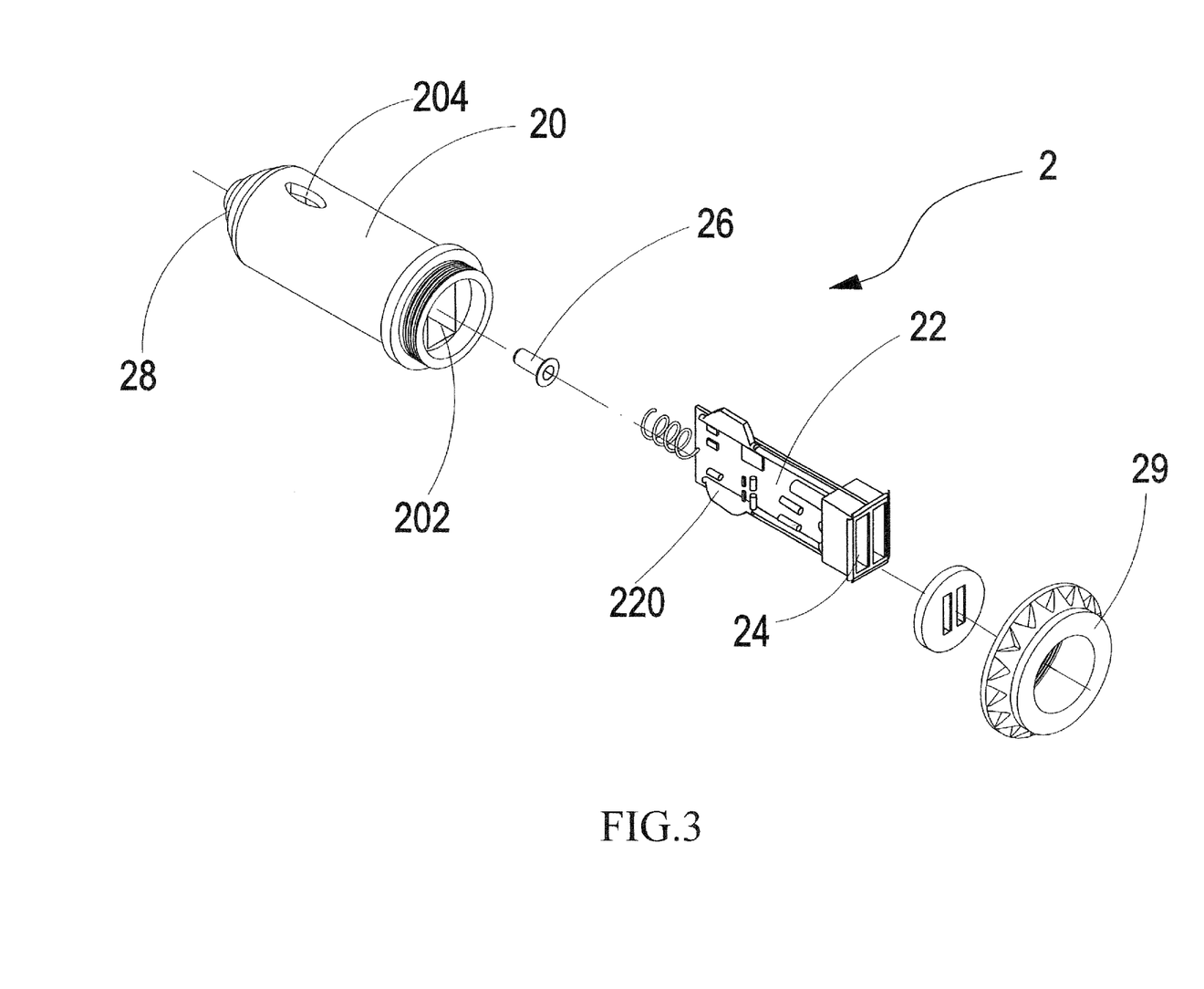
FIG. 3 is an exploded view showing the one-piece car charger constructed in accordance with the preferred embodiment of the present invention.
Figure 4:
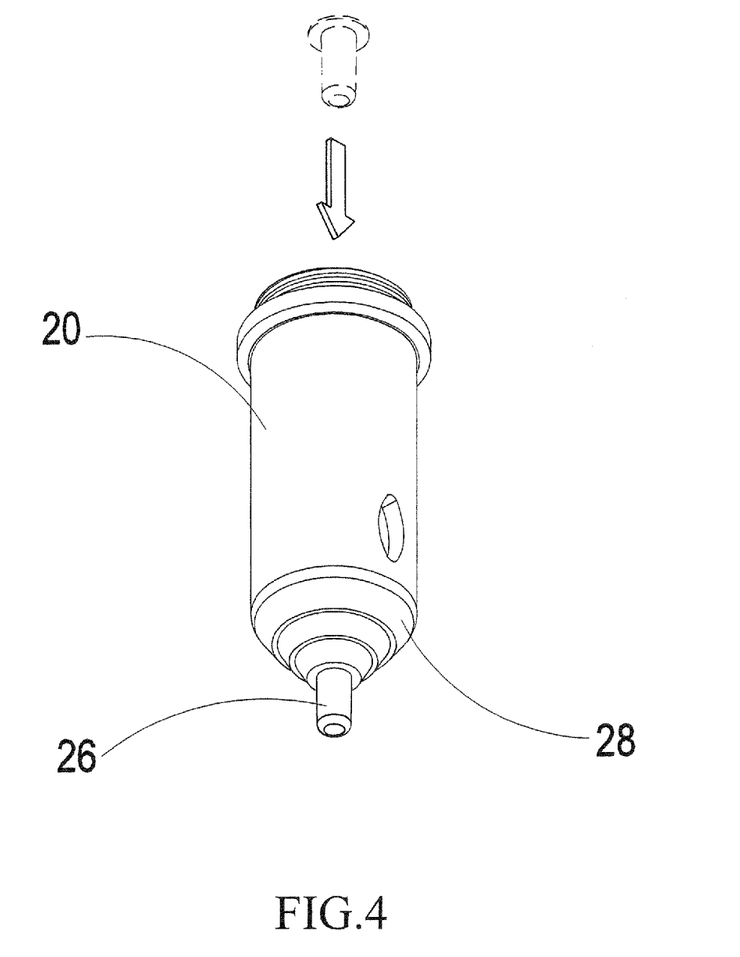
FIG. 4 is a perspective view showing an application of the present invention.

Referring to FIGS. 2 and 3, which respectively shows a perspective view and an exploded view of a one-piece car charger constructed in accordance with a preferred embodiment of the present invention, the car charger of the present invention, generally designated at 2 comprises an enclosure 20 and a circuit board 22 (which comprises a voltage transformation circuit). The circuit board 22 that is received in the enclosure 20 is electrically connected to a power output port 24 (such as a serial (USB) socket or a charging cable and socket for charging a regular electrical appliance). The enclosure 20 is of a one-piece configuration. The enclosure 20 forms an accommodation chamber 202 that receives the circuit board 22 to insert therein. The circuit board 22 is provided with a set of negative-electrode conductive spring plates 220. In assembling the circuit board 22, the negative-electrode conductive spring plates 220 are guided by and through the accommodation chamber 202 to make engagement with through holes 204 defined in the enclosure 20. Further, as shown in FIG. 4, the enclosure 20 has a front end forming a conic cap 28, and this cap 28 helps leading the insertion of a positive-electrode conductive contact 26.

With the above discussed structure and arrangement, the operation of the present invention will be described as follows with reference to FIGS. 4, 5, 6, 6A, and 6B, which are respectively a perspective view showing an application of the present invention, another perspective view showing the application of the present invention, a further perspective view showing the application of the present invention, a perspective view showing one way of assembling a cover, and a perspective view showing another way of assembling the cover, since the front end of the enclosure 20 forms the cap 28 that is of a conic configuration, in assembling the positive-electrode conductive contact 26, it is easy to put in and position the positive-electrode conductive contact 26.

Figure 5:
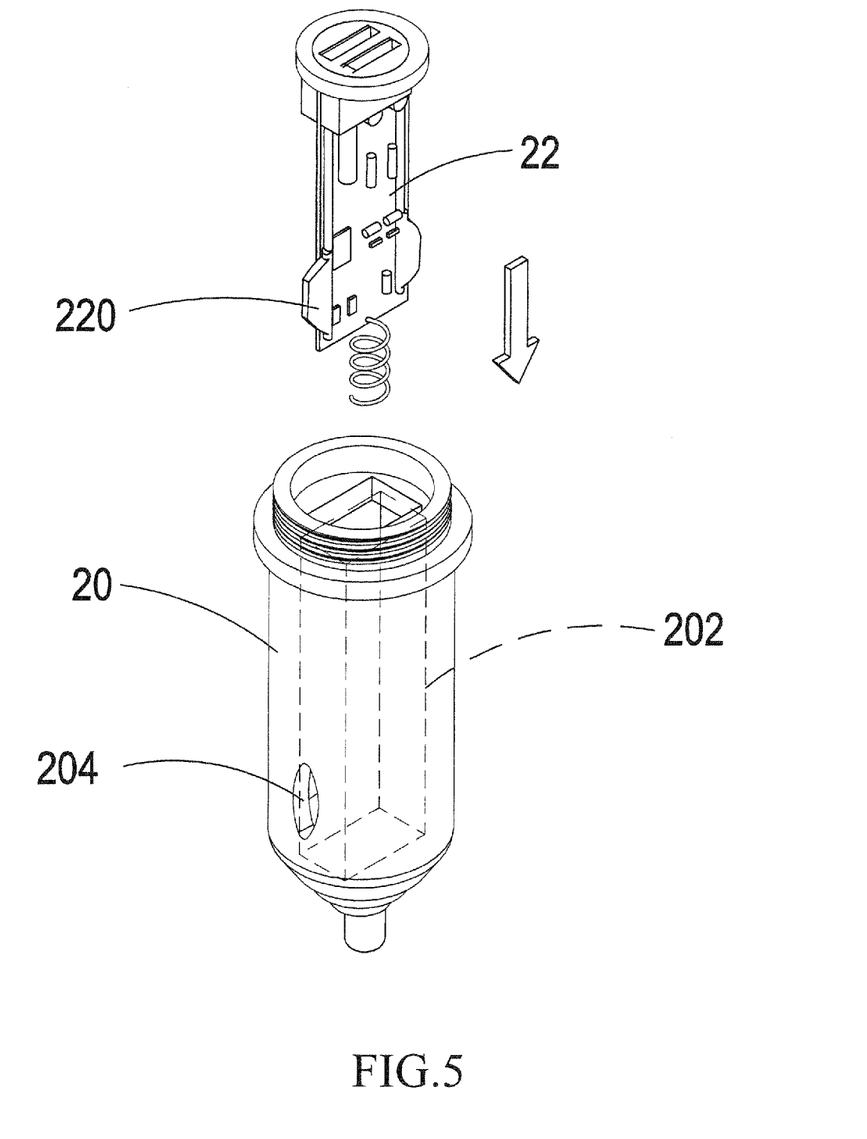
FIG. 5 is another perspective view showing the application of the present invention.
Figure 6:
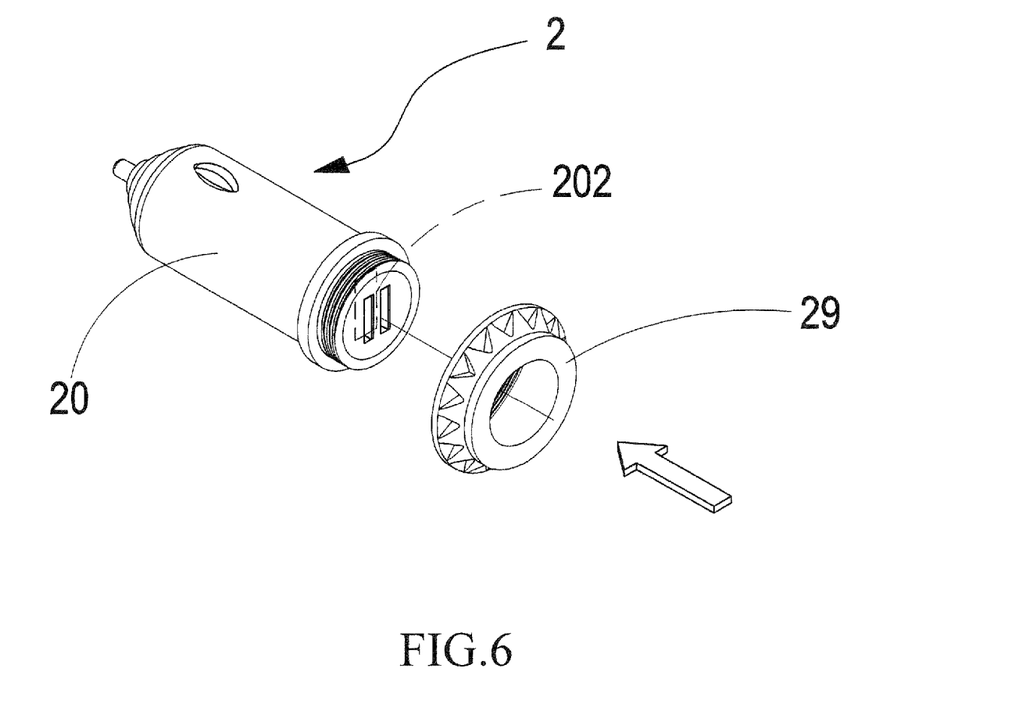
FIG. 6 is a further perspective view showing the application of the present invention.
Figure 6A:
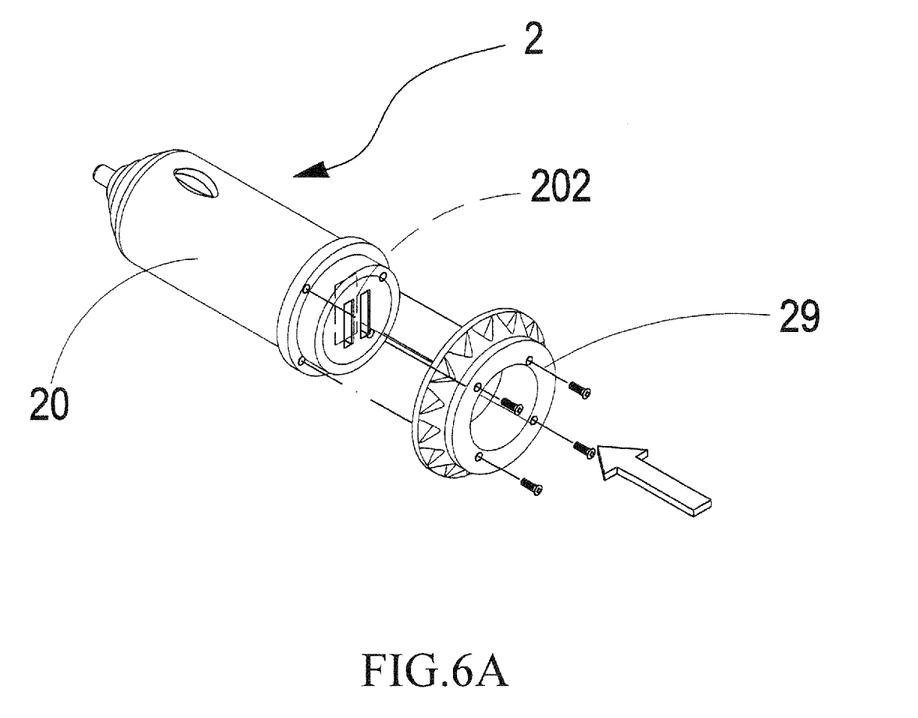
FIG. 6A is a perspective view showing one way of assembling a cover of the car charger of the present invention.
Figure 6B:
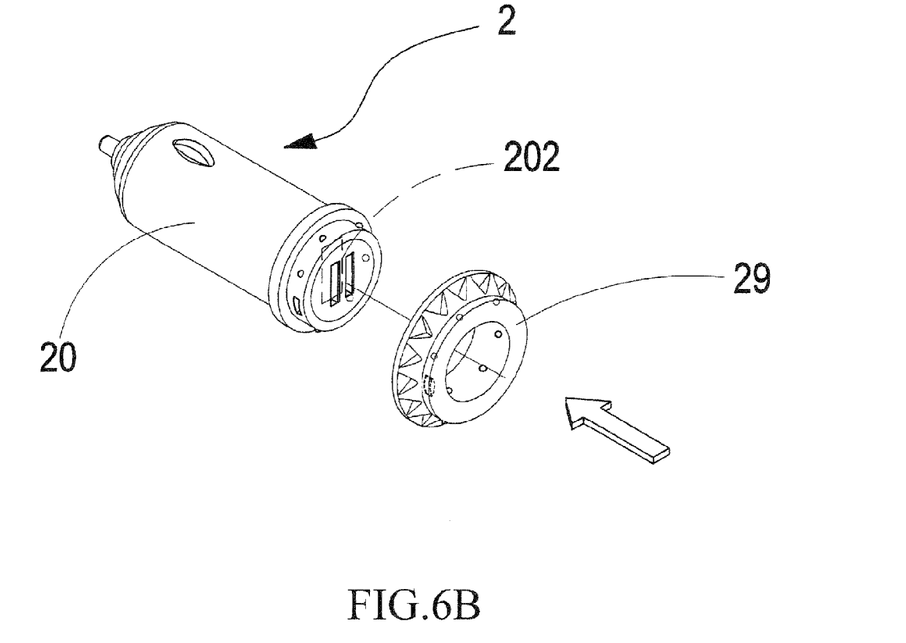
FIG. 6B is a perspective view showing another way of assembling the cover of the car charger of the present invention.

Afterwards, the one-piece integrally-formed configuration of the enclosure 20 allows for the performance of an automatic manufacturing operation. In assembling the circuit board 22, the circuit board 22 can be guided by and received into the accommodation chamber 202 of the enclosure 20. Under this condition, the negative-electrode conductive spring plates 220 provided on the circuit board 22 are guided into engagement with the through holes 204 formed in the enclosure 20 (whereby the negative electrode 22 and the positive electrode 26 are engageable with positive and negative contacts of a cigarette lighter socket of the car) to realize electrical conduction and retention of the circuit board 22.

Finally, a cover 29 is applied to close the accommodation chamber 202 of the enclosure 20. The cover 29 can be fixed to the enclosure 20 through threading engagement (see FIG. 6A), ultrasonic fusion, or snap-on clamping (see FIG. 6B) to complete the assembling operation of the car charger 2. The one-piece configuration of the enclosure 20 helps to significantly reduce the manufacturing time (and is applicable to automatized manufacturing). There is no need for operators to assemble the enclosures one by one, so that the manufacturing time is shortened and mistaken assembling of incorrect parts is eliminated.

Figure 7:
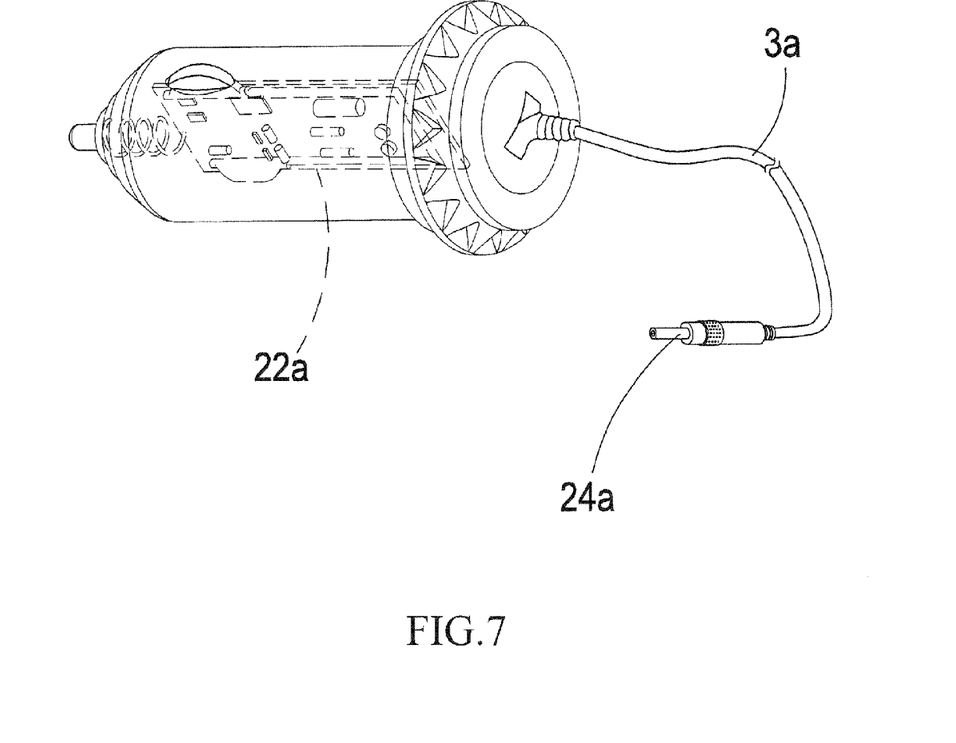
FIG. 7 is a perspective view showing a car charger according to another embodiment of the present invention.

Referring to FIG. 7, which is a perspective view showing a car charger according to another embodiment of the present invention, the car charger comprises a circuit board 22A to which a transmission cable 3A is connected. The transmission cable 3A has an opposite end electrically connected to a power output port 24A. This arrangement helps extending a reachable range of the power output port 24A.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A car charger, comprising an enclosure and a circuit board, the enclosure receiving the circuit board that has opposite side edges and a rear end therein and the rear end of the circuit board being electrically connected to a power output port, a single-piece negative-electrode conductive spring plate being directly mounted to and electrically connected with the circuit board in such a way that the negative-electrode conductive spring plate projects beyond one of the side edges, wherein the enclosure is integrally formed as a one-piece configuration that comprises a circumferential wall that defines an accommodation chamber formed in the enclosure and has a rear end forming an opening in communication with the accommodation chamber for receiving insertion of the circuit board into the accommodation chamber, a through hole being formed in the circumferential wall in communication with the accommodation space, the rear end opening and the accommodation space being of a predetermined cross-sectional configuration to guide the insertion of the circuit board into the accommodation chamber at a predetermined angular position with respect to the enclosure so that the circuit board is positioned and oriented in the accommodation space with the negative-electrode conductive spring plate being directly fit in and projecting out of the through hole of the circumferential wall of the enclosure.

2. The car charger according to claim 1 further comprising a cover that closes the rear end opening of the accommodation chamber of the enclosure.

3. The car charger according to claim 1, wherein the enclosure has a front end forming a conic cap to help a positive-electrode conductive contact to insert into the cap.

4. The car charger according to claim 1 further comprising a transmission cable that is connected to the circuit board, the transmission cable having an opposite end electrically connected to the power output port.

5. The car charger according to claim 1, wherein the power output port comprises a serial (USB) socket or a charging cable and socket for charging a regular electrical appliance.

6. The car charger according to claim 1, wherein the circuit board comprises a voltage transformation circuit.

\* \* \* \* \*